United States Patent
Kim et al.

(10) Patent No.: US 12,520,297 B2
(45) Date of Patent: Jan. 6, 2026

(54) METHOD AND APPARATUS FOR SELECTING RESOURCES FOR BEAM-BASED SIDELINK COMMUNICATION AND SIDELINK COMMUNICATION USING THE SAME

(71) Applicant: ELECTRONICS AND TELECOMMUNICATIONS RESEARCH INSTITUTE, Daejeon (KR)

(72) Inventors: Jun Hyeong Kim, Daejeon (KR); Go San Noh, Daejeon (KR); Il Gyu Kim, Daejeon (KR); Man Ho Park, Daejeon (KR); Nak Woon Sung, Daejeon (KR); Jae Su Song, Daejeon (KR); Nam Suk Lee, Daejeon (KR); Hee Sang Chung, Daejeon (KR); Min Suk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 416 days.

(21) Appl. No.: 18/099,464

(22) Filed: Jan. 20, 2023

(65) Prior Publication Data
US 2023/0292300 A1    Sep. 14, 2023

(30) Foreign Application Priority Data

Jan. 21, 2022  (KR) .................. 10-2022-0009266
Jan. 20, 2023  (KR) .................. 10-2023-0008788

(51) Int. Cl.
*H04W 72/044*  (2023.01)
*H04W 72/40*   (2023.01)
*H04W 72/54*   (2023.01)

(52) U.S. Cl.
CPC ......... *H04W 72/046* (2013.01); *H04W 72/40* (2023.01); *H04W 72/54* (2023.01)

(58) Field of Classification Search
CPC ............... H04W 72/046; H04W 72/40; H04W 72/54; H04W 72/12; H04W 76/14; H04W 92/18; H04B 7/0408; H04B 7/0617
See application file for complete search history.

(56) References Cited

U.S. PATENT DOCUMENTS

| | | |
|---|---|---|
| 10,411,785 B2 | 9/2019 | Davydov et al. |
| 2021/0044956 A1 | 2/2021 | Kim |

(Continued)

FOREIGN PATENT DOCUMENTS

| | | | |
|---|---|---|---|
| WO | 2017023231 A1 | | 2/2017 |
| WO | WO 2020113241 A2 | * | 6/2020 |
| WO | WO 2021045478 A1 | * | 3/2021 |

*Primary Examiner* — Rushil P. Sampat
(74) *Attorney, Agent, or Firm* — LRK PATENT LAW FIRM

(57) ABSTRACT

A method of a transmitting terminal may include: determining a beam candidate set including two or more beams usable for sidelink communication with a receiving terminal from among a plurality of beams that can be beam-formed; determining a resource set for each beam within the beam candidate set through resource sensing, such that the resource set has candidate resources equal to or greater than a predetermined number of candidate resources; selecting a beam and a resource to be used for sidelink communication with the receiving terminal based on the beam candidate set and the resource set; and transmitting sidelink data to the receiving terminal using the selected beam and the selected resource.

18 Claims, 11 Drawing Sheets

(56) References Cited

U.S. PATENT DOCUMENTS

| | | |
|---|---|---|
| 2021/0160850 A1 | 5/2021 | Akkarakaran et al. |
| 2022/0046430 A1 | 2/2022 | Liu et al. |
| 2022/0046594 A1 | 2/2022 | Lee et al. |
| 2022/0124729 A1 | 4/2022 | Ji et al. |
| 2022/0140951 A1 | 5/2022 | He et al. |
| 2022/0167180 A1* | 5/2022 | Choi .................... H04W 8/005 |
| 2022/0256524 A1* | 8/2022 | Kwon .................. H04B 7/0408 |
| 2022/0264376 A1* | 8/2022 | Hosseini ............... H04W 72/02 |
| 2022/0295305 A1* | 9/2022 | Hwang .................... H04B 7/06 |
| 2023/0345510 A1* | 10/2023 | Zhang .................. H04W 72/40 |
| 2024/0015841 A1* | 1/2024 | Ji ......................... H04W 72/02 |

* cited by examiner

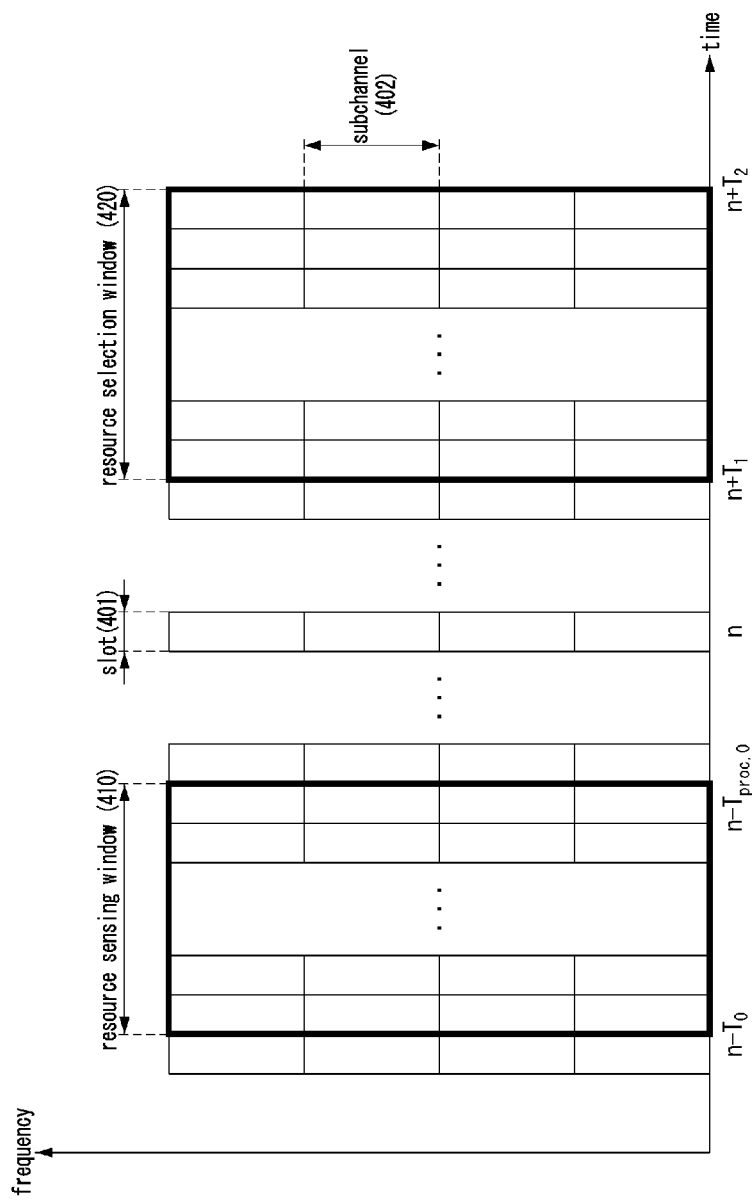

METHOD AND APPARATUS FOR SELECTING RESOURCES FOR BEAM-BASED SIDELINK COMMUNICATION AND SIDELINK COMMUNICATION USING THE SAME

CROSS-REFERENCE TO RELATED APPLICATIONS

This application claims priority to Korean Patent Applications No. 10-2022-0009266, filed on Jan. 21, 2022, and No. 10-2023-0008788, filed on Jan. 20, 2023, with the Korean Intellectual Property Office (KIPO), the entire contents of which are hereby incorporated by reference.

BACKGROUND

1. Technical Field

Exemplary embodiments of the present disclosure relate to a sidelink communication technique, and more particularly, to a beam-based sidelink communication technique.

2. Description of Related Art

The Vehicle-to-Everything (V2X) communication technology is a communication technology for exchanging various information including traffic information with other vehicles and other infrastructures such as roads through wired/wireless networks. The V2X communication of the prior arts includes communication between vehicles (i.e., Vehicle-to-Vehicle (V2)), between vehicle and road infrastructure/network (i.e., Vehicle-to-Infrastructure/Network (V2I/N)), between vehicle and pedestrian (i.e., Vehicle-to-Pedestrian (V2P)), and/or the like. As an example of the V2X communication, vehicles within a certain range may exchange their location/speed information and surrounding traffic information through V2V communication to prevent sudden traffic accidents or to provide a platooning service in which a plurality of vehicles connected by V2V communication drive on a highway. In addition, by providing a high-speed wireless backhaul service to vehicles through V2I/N communication, users within the vehicles can use high-speed Internet services and drive/control the vehicles remotely using the V2I/N wireless network.

Meanwhile, the 5G New Radio (NR) standard makes it possible to reliably provide high-speed data using a beamforming technique while transmitting signals in a higher frequency band. Therefore, even in sidelink communication, a beamforming-based resource allocation and communication method is required.

SUMMARY

Exemplary embodiments of the present disclosure provide a method and an apparatus for resource selection and communication in beamforming-based sidelink.

According to a first exemplary embodiment of the present disclosure, a method of a transmitting terminal may comprise: determining a beam candidate set including two or more beams usable for sidelink communication with a receiving terminal from among a plurality of beams that can be beam-formed; determining a resource set for each beam within the beam candidate set through resource sensing, such that the resource set has candidate resources equal to or greater than a predetermined number of candidate resources; selecting a beam and a resource to be used for sidelink communication with the receiving terminal based on the beam candidate set and the resource set; and transmitting sidelink data to the receiving terminal using the selected beam and the selected resource.

The method may further comprise: periodically measuring a signal strength for each of two or more beams within the beam candidate set; and updating beams within the beam candidate set based on the measured signal strengths.

The method may further comprise: receiving at least one of a non-preferred beam set and a preferred beam set from the receiving terminal.

The method may further comprise: assigning a first weight to each beam of the preferred beam set; assigning a second weight to each beam of the non-preferred beam set; calculating scores of at least one beam to which the first weight is assigned and at least one beam to which the second weight is assigned; and determining the beam candidate set based on the calculated scores, wherein the first weight is a value greater than the second weight.

The method may further comprise: receiving, from the receiving terminal, information on a minimum amount of resources for each beam on which sensing is to be performed during an inactive time of the transmitting terminal.

The information on the minimum amount of resources may include a number of logical slots, and the information on the minimum amount of resources may be included in sidelink control information (SCI) or a medium access control (MAC) control element (CE) transmitted from the receiving terminal.

The method may further comprise: grouping two or more beams among the plurality of beams into one group; and performing beam sensing based on the group.

When selecting beams to be used for broadcasting from the beam candidate set, beams whose reference signal received powers (RSRPs) measured through the resource sensing are equal to or greater than a pre-configured first threshold may be selected as the beams to be used for broadcasting.

The method may further comprise: when selecting beams to be used for broadcasting from the beam candidate set, selecting first beams having a channel busy ratio (CBR) equal to or greater than a pre-configured first threshold from the beam candidate set.

According to a second exemplary embodiment of the present disclosure, a transmitting terminal may comprise a processor, and the processor may cause the transmitting terminal to perform: determining a beam candidate set including two or more beams usable for sidelink communication with a receiving terminal from among a plurality of beams that can be beam-formed; determining a resource set for each beam within the beam candidate set through resource sensing, such that the resource set has candidate resources equal to or greater than a predetermined number of candidate resources; selecting a beam and a resource to be used for sidelink communication with the receiving terminal based on the beam candidate set and the resource set; and transmitting sidelink data to the receiving terminal using the selected beam and the selected resource.

The processor may further cause the transmitting terminal to perform: periodically measuring a signal strength for each of two or more beams within the beam candidate set; and updating beams within the beam candidate set based on the measured signal strengths.

The processor may further cause the transmitting terminal to perform: receiving at least one of a non-preferred beam set and a preferred beam set from the receiving terminal.

The processor may further cause the transmitting terminal to perform: assigning a first weight to each beam of the preferred beam set; assigning a second weight to each beam of the non-preferred beam set; calculating scores of at least one beam to which the first weight is assigned and at least one beam to which the second weight is assigned; and determining the beam candidate set based on the calculated scores, wherein the first weight is a value greater than the second weight.

The processor may further cause the transmitting terminal to perform: receiving, from the receiving terminal, information on a minimum amount of resources for each beam on which sensing is to be performed during an inactive time of the transmitting terminal; and performing resource sensing for each beam included within the beam candidate set during the inactive time of the transmitting terminal based on the information on the minimum amount of resources.

The information on the minimum amount of resources may include a number of logical slots, and the information on the minimum amount of resources may be included in sidelink control information (SCI) or a medium access control (MAC) control element (CE) transmitted from the receiving terminal.

The processor may further cause the transmitting terminal to perform: grouping two or more beams among the plurality of beams into one group; and performing beam sensing based on the group.

The processor may further cause the transmitting terminal to perform, when selecting beams to be used for broadcasting from the beam candidate set, configuring beams whose reference signal received powers (RSRPs) measured through the resource sensing are equal to or greater than a pre-configured first threshold as the beams to be used for broadcasting.

The processor may further cause the transmitting terminal to perform, when selecting beams to be used for broadcasting from the beam candidate set, selecting first beams having a channel busy ratio (CBR) equal to or greater than a pre-configured first threshold from the beam candidate set.

According to a third exemplary embodiment of the present disclosure, a method of a receiving terminal may comprise: performing an initial access procedure with a transmitting terminal capable of sidelink communication through a plurality of beams by using a first beam of the transmitting terminal; transmitting at least one of a non-preferred beam set and a preferred beam set to the transmitting terminal; and when the transmitting terminal performs sidelink discontinuous reception (DRX), transmitting, to the transmitting terminal, information on a minimum amount of resources for each beam on which sensing is to be performed during a DRX inactive time of the transmitting terminal.

The information on the minimum amount of resources includes a number of logical slots, and the information on the minimum amount of resources may be included in sidelink control information (SCI) or a medium access control (MAC) control element (CE) transmitted from the receiving terminal.

According to the exemplary embodiments of the present disclosure, in a beam-based sidelink communication environment, the terminal can perform an efficient resource selection procedure for each beam and beam-based sidelink transmission. Accordingly, there is an advantage in that sidelink communication can be performed even in a high frequency band where beamforming technology is necessarily applied.

BRIEF DESCRIPTION OF DRAWINGS

FIG. 4 is an exemplary diagram for describing a resource sensing window and a resource selection window configured in a terminal operating in the resource allocation mode 2 of NR V2X.

DETAILED DESCRIPTION OF THE EMBODIMENTS

Figure 1:
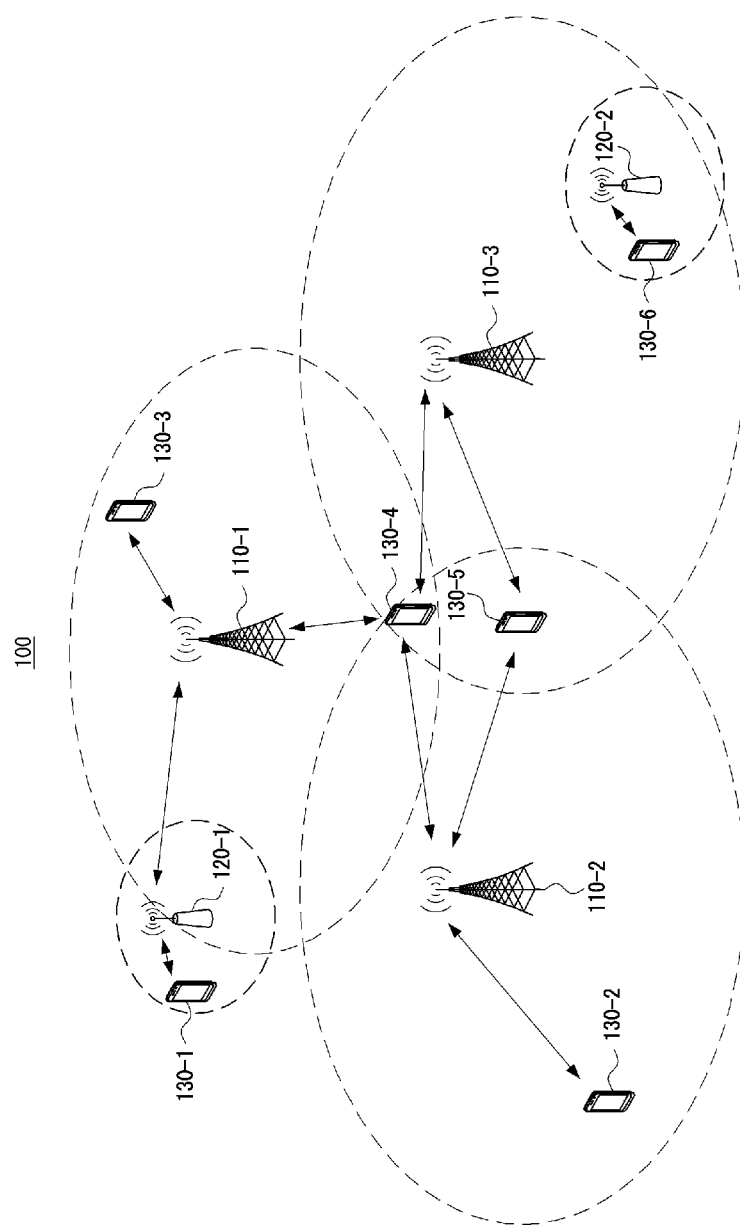
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
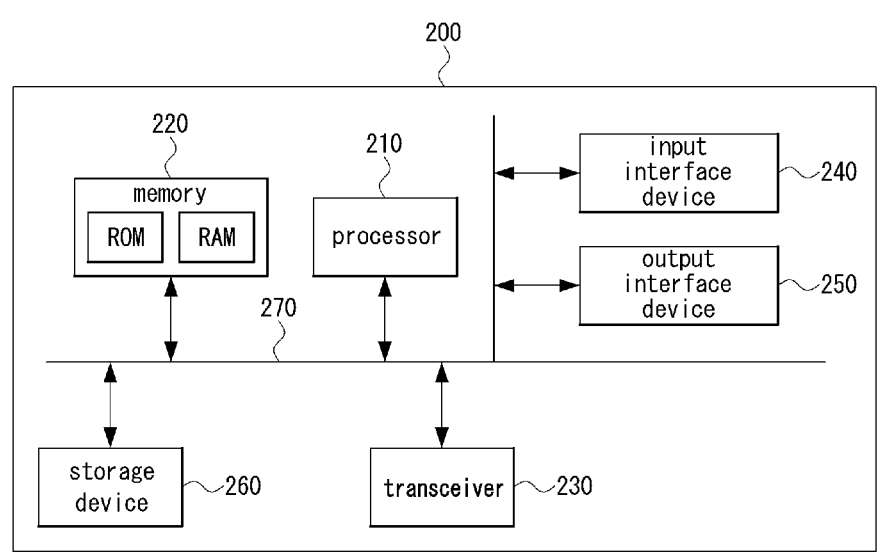
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods and apparatuses for sidelink communication will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Hereinafter, sidelink communication will be described. The Vehicle-to-Everything (V2X) communication technology is a communication technology for exchanging various information including traffic information with other vehicles and other infrastructures such as roads through wired/wireless networks. The V2X communication of the prior arts includes communication between vehicles (i.e., Vehicle-to-Vehicle (V2)), between vehicle and road infrastructure/network (i.e., Vehicle-to-Infrastructure/Network (V2I/N)), between vehicle and pedestrian (i.e., Vehicle-to-Pedestrian (V2P)), and/or the like. As an example of the V2X communication, vehicles within a certain range may exchange their location/speed information and surrounding traffic information through V2V communication to prevent sudden traffic accidents or to provide a platooning service in which a plurality of vehicles connected by V2V communication drive on a highway. In addition, by providing a high-speed wireless backhaul service to vehicles through V2I/N communication, users within the vehicles can use high-speed Internet services and drive/control the vehicles remotely using the V2I/N wireless network.

In various wireless communication systems including the 3GPP 4G Long Term Evolution (LTE) system, 'device-to-device (D2D)' communication scheme has been adopted to support various wireless communication services such as the V2X service. In the D2D communications scheme, terminals directly communicate with each other without going through network node(s). In the case of 3GPP, a direct communication link between terminals is defined as a sidelink. In the case of LTE, communication between terminals through a sidelink is possible even when out of network coverage, and the LTE sidelink has been first standardized for D2D communication in LTE Release-12. Thereafter, there have been many standardization efforts in the 3GPP to improve the sidelink to be suitable for V2X communication.

In June 2018, the 3GPP has completed the 5G New Radio (NR) Release-15 specifications, and started standardizing NR V2X, 3GPP V2X phase 3, from the RAN1 #94 meeting in August 2018. In addition to the existing LTE-based V2X services, the NR V2X is directed to supporting improved V2X services and supplementing the LTE V2X services rather than replacing the services provided by the LTE V2X by interworking with the LTE V2X. In this reason, the NR V2X should satisfy higher requirements than those of the LTE V2X.

Currently, the NR V2X standardization is in progress, focusing primarily on sidelink design. As described above, a sidelink is a communication link through which data packets can be directly exchanged between terminals without going through a network.

Figure 3A:
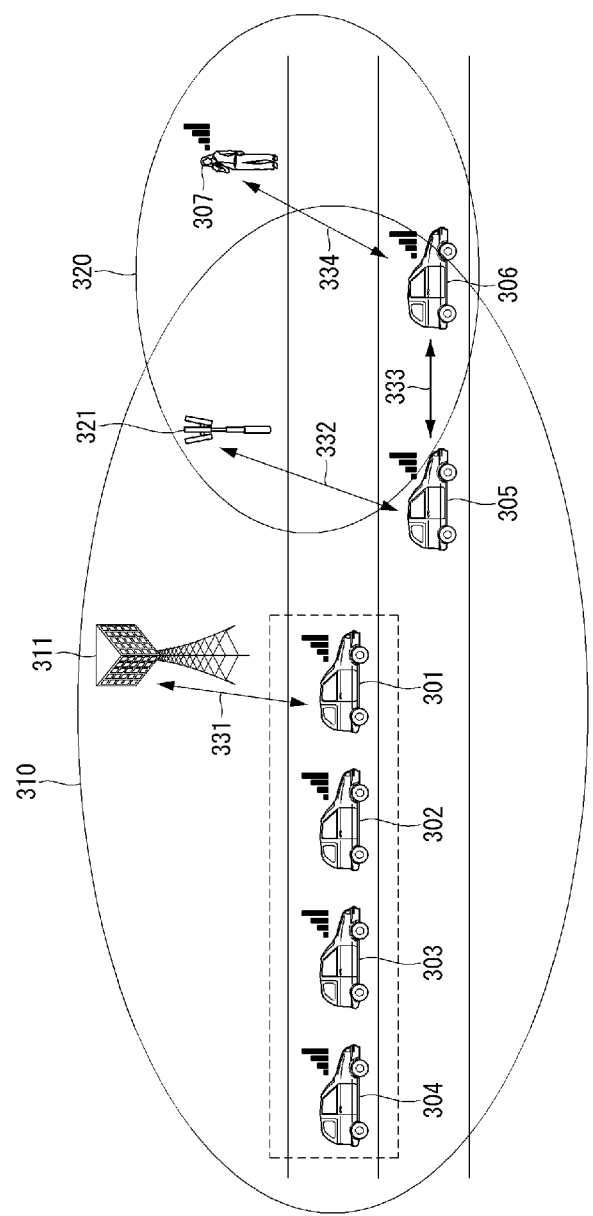
FIG. 3A is a conceptual diagram for describing types of sidelink communication according to the present disclosure.

FIG. 3A is a conceptual diagram for describing types of sidelink communication according to the present disclosure.

Referring to FIG. 3A, a base station (BS) 311 may have a base station communication coverage 310. A plurality of vehicle terminals 301, 302, 303, 304, 305, and 306 may be located within the base station communication coverage 310. In addition, a roadside unit (RSU) 321 may have a roadside unit communication coverage 320 based on a sidelink communication scheme. In addition, a plurality of terminals 305, 306, and 307 may be located within the roadside unit communication coverage 320. In FIG. 3A, a user having the terminal 307 capable of sidelink communication with the vehicle terminals 301, 302, 303, 304, 305, and 306 driving on a road is exemplified. The vehicle terminal may be a terminal mounted in a vehicle (or attached to the vehicle, or carried or worn by a driver or passenger of the vehicle). These vehicle terminals 301 to 306 will be referred to as vehicles for convenience of description. In addition, a pedestrian carrying (or wearing) the terminal 307 capable of sidelink communication will be referred to as a pedestrian or a user for convenience of description. In addition, since FIG. 3A is a diagram for describing sidelink communication according to the present disclosure, only parts related to the sidelink communication will be described. Then, various sidelink communications will be described below.

Sidelink communication between the base station 311 and the vehicle 301 is referred to as vehicle-to-network (V2N) communication 331. The V2N communication 331 may consist of a downlink (DL) from the base station 311 to the vehicle 301 and an uplink (UL) from the vehicle 301 to the base station 311.

Sidelink communication between the roadside unit 321 and the vehicle 305 is referred to as Vehicle-to-Infrastructure (V2I) communication 332. The V2I communication 332 may consist of a downlink (DL), an uplink (UL) and/or a sidelink (SL).

Sidelink communication between the vehicle 305 and the vehicle 306 is referred to as Vehicle-to-Vehicle (V2V) communication 333. The V2V communication 333 is a scheme of performing direct communication between the vehicles, and various data can be transmitted/received between the vehicles without control of a base station or roadside unit.

Further, sidelink communication between the vehicle 306 and the pedestrian 307 is referred to as Vehicle-to-Pedestrian (V2P) communication 334. The communication between the vehicle 306 and the pedestrian 307 may refer to communication between a high-speed moving object and a walking low-speed moving object. In addition, the V2P communication 334 may include communication between pedestrians or communication between users riding low-speed vehicles such as vehicles and bicycles.

Figure 3B:
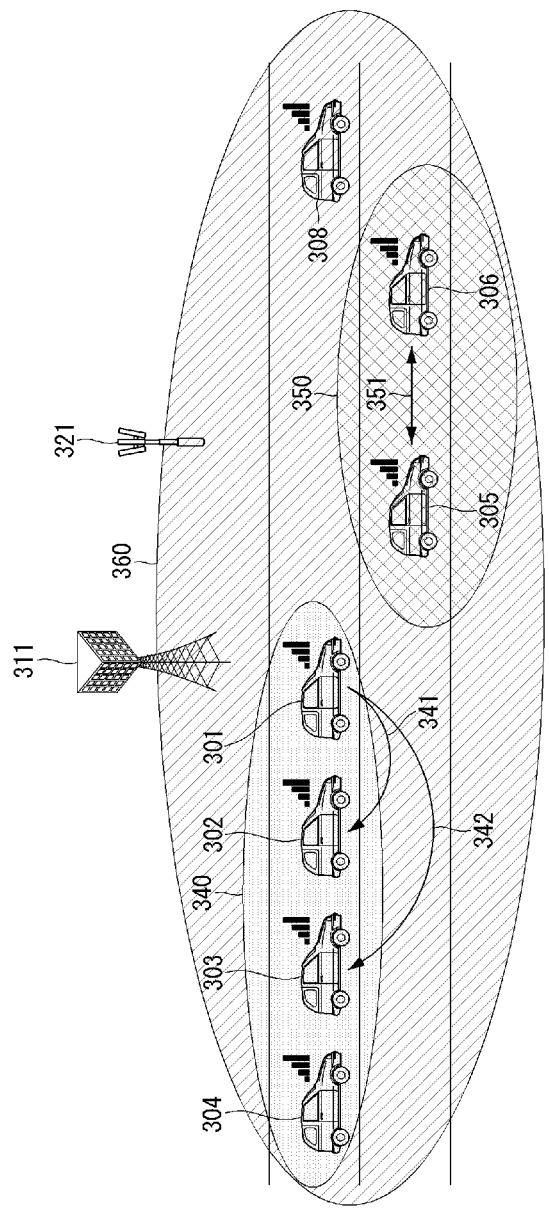
FIG. 3B is a conceptual diagram for describing broadcast, groupcast, and unicast-based sidelink communication provided by the NR V2X.

FIG. 3B is a conceptual diagram for describing broadcast, groupcast, and unicast-based sidelink communication provided by the NR V2X.

In contrast to FIG. 3A, in FIG. 3B, a new vehicle 308 is illustrated instead of the user 307, the communication coverage of the base station 311 is not illustrated, and the communication coverage of the roadside unit 321 is not illustrated. Except for the above, all other parts are the same.

A broadcast region 360 for broadcast-based sidelink communication mainly provided by the LTE V2X may be a region in which a beacon frame is transmitted by a specific communication device. In addition, the NR V2X has introduced unicast and groupcast-based sidelink communication to support more diverse V2X services in addition to the broadcast-based sidelink communication.

FIG. 3B illustrates one groupcast communication region 340 of a group to which the vehicles 301, 302, 303, and 304 belong, and a unicast communication region 350 for unicast communication between the vehicle terminals 305 and 306.

A case in which the vehicle 301 transmits data to other vehicles 302 and 303 within the groupcast communication region 340 based on groupcast is illustrated (341, 342). In particular, the form illustrated in FIG. 3B may be a form of vehicle platooning. In the case of vehicle platooning, the lead vehicle 301 may transmit sidelink messages to the other vehicles 302 and 303 in the group of vehicles moving together to adjust distances between the vehicles. FIG. 3B illustrates a case where the vehicle 301, which is a terminal within the group, transmits data to the vehicles 302 and 303 within the groupcast communication region 340, but a terminal outside the group may also transmit messages to the vehicles 301 to 304 within the group through groupcast communication.

In addition, in the case of unicast communication, the vehicles 305 and 306 may exist within a unicast communication region 350 and may communicate with each other. Therefore, in the NR V2X system, the vehicles 305 and 306 may transmit/receive messages directly therebetween through unicast communication.

Meanwhile, the NR V2X supports a resource allocation mode 2, which is a scheme of communicating only through sidelinks without control of the base station. In supporting the resource allocation mode 2, the most core technologies are resource sensing and resource selection methods for sidelink resources allocated to the terminal. Hereinafter, resource sensing and resource selection will be described with reference to FIG. 4.

FIG. 4 is an exemplary diagram for describing a resource sensing window and a resource selection window configured in a terminal operating in the resource allocation mode 2 of NR V2X.

A sidelink resource pool in which transmission and reception is performed may be composed of slot(s) (e.g., 401) in the time domain and subchannel(s) (e.g., 402) in the frequency domain. FIG. 4 illustrates an example in which a terminal operating in the resource allocation mode 2 receives a resource selection trigger in a slot n. When a resource selection operation is triggered in the slot n, the terminal may sense resources in slots of a time period corresponding to a resource sensing window 410. In FIG. 4, a time period of $[n-T_0, n-T_{proc,0}]$ is exemplified as an example of the time period sensed according to the resource sensing window 410. The terminal may select a resource for transmission within a time period corresponding to a resource selection window 420 based on the result of sensing the resources in the resource sensing window 410. In FIG. 4, a time period of $[n+T_1, n+T_2]$ is exemplified as an example of the time period of the resource selection window 420.

Figure 5:
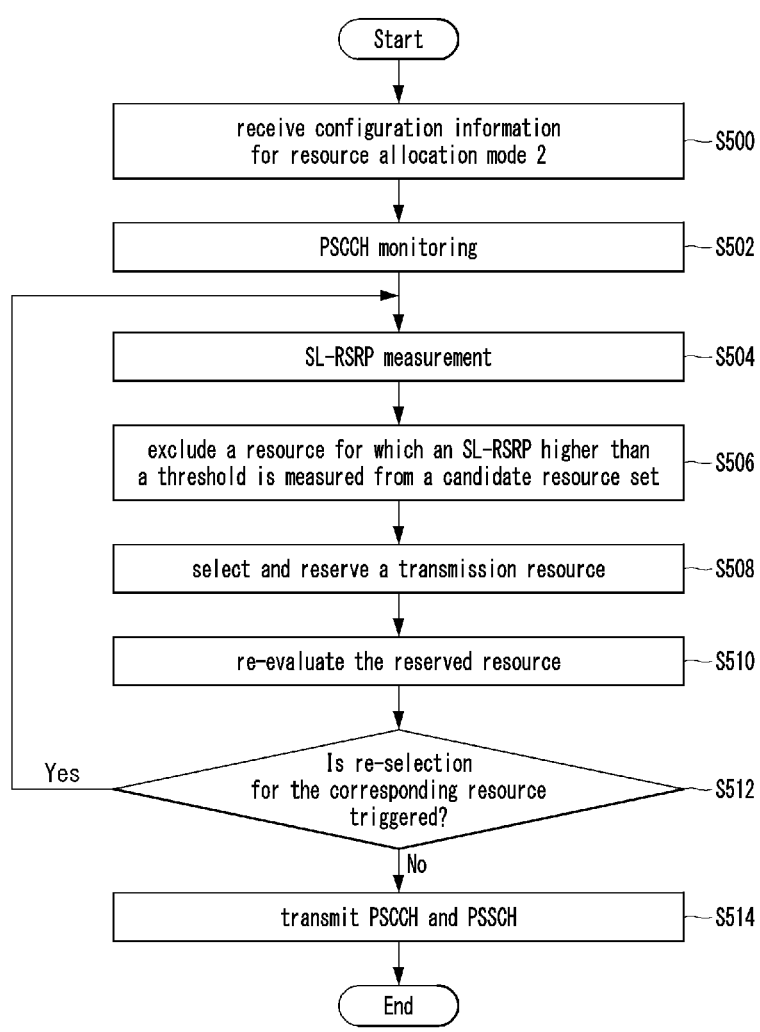
FIG. 5 is a flowchart for sidelink communication in a terminal operating in the sidelink resource allocation mode 2.

FIG. 5 is a flowchart for sidelink communication in a terminal operating in the sidelink resource allocation mode 2.

Referring to FIG. 5, the terminal may receive various configuration information for the resource allocation mode 2 from a higher layer (S500). The configuration information may include various parameters required for resource selection and resource sensing, such as resource pool configuration information, priority information, data packet delay budget (PDB) information, resource reservation interval information, candidate resource set information, resource selection window size information, resource sensing window size information, reference signal received power (RSRP) threshold information, and/or the like.

The terminal may continuously perform monitoring on a physical sidelink control channel (PSCCH) corresponding to a sidelink control channel (S502).

The terminal may measure RSRPs of a demodulation reference signal (DMRS) of the PSCCH detected from the monitoring and a DMRS of a physical sidelink shared channel (PSSCH), which is a sidelink data channel scheduled by the PSCCH (S504).

The terminal may exclude a resource for which an RSRP higher than the threshold received through the configuration information is measured from a preconfigured candidate resource set (S506).

The terminal may select and reserve a resource to be used for transmission from among remaining resources in the candidate resource set except for the excluded resource(s) (S508).

The terminal may re-evaluate the reserved resource (S510).

The terminal may determine whether re-selection for the resource is triggered (S512). As a result of the determination in step S512, if re-selection of the resource to be used for transmission is triggered, the terminal may perform the procedure again from step S504. On the other hand, if it is determined in step S512 that re-selection of the resource to be used for transmission is not triggered, the terminal may transmit a PSCCH and a PSSCH using the resource as it is (S514).

Meanwhile, when the resource selection procedure is triggered in the slot n for the terminal operating in the resource allocation mode 2 in the sidelink-based communication system, the terminal may perform the resource selection procedure according to the following steps. The resource selection procedure described here will be described based on the contents described in the section 8.1.4 of TS 38.214, which is the 3GPP technical specification.

Step 1: Determine a candidate resource set $R_{x,y}$. Here, $R_{x,y}$ may be defined as consecutive $L_{subCH}$ subchannels starting from the $t_y$-th slot in the time domain and the x-th subchannel in the frequency domain within a resource pool configured to the terminal. That is, in the frequency domain, it may comprise subchannels x, x+1, x+2, ..., and x+$L_{subCH}$. The terminal may determine the candidate resource set corresponding to $R_{x,y}$ existing in the resource pool within the time period corresponding to the resource selection window 420, that is, the entire time $[n+T_1, n+T_2]$. In this case, $T_1$ and $T_2$ may be defined as follows.

$T_1$ may be a value that satisfies '$0 \leq T_1 \leq T_{proc,1}$', and may be determined according to an implementation of the terminal. Here, $T_{proc},1$ may be defined according to a subcarrier spacing as shown in Table 1 below.

TABLE 1

| $\mu_{SL}$ | $T_{proc,1}$ [slots] |
|---|---|
| 0 | 3 |
| 1 | 5 |

TABLE 1-continued

| $\mu_{SL}$ | $T_{proc, 1}$ [slots] |
|---|---|
| 2 | 9 |
| 3 | 17 |

If a value of $T_{2\ min}$ is smaller than a remaining packet delay budget (PDB), a value of $T_2$ may be determined according to an implementation of the terminal as a value satisfying '$T_{2\ min} \leq T_2 \leq$ remaining PDB'. If the value of $T_{2\ min}$ is greater than or equal to the remaining PDB, the value of $T_2$ may be determined as the remaining PDB.

The number of candidate resources within the candidate resource set determined through Step 1 described above may be defined as $M_{total}$.

Step 2: Determine the resource sensing window 410. The resource sensing window 410 may be defined as $[n-T_0, n-T_{proc,0}^{SL}]$, where $T_0$ may correspond to a value set by a parameter sl-SensingWindow from the higher layer, and $T_{proc,0}^{SL}$ may be defined according to the subcarrier spacing as shown in Table 2 below.

TABLE 2

| $\mu_{SL}$ | $T_{proc, 0}^{SL}$ [slots] |
|---|---|
| 0 | 1 |
| 1 | 1 |
| 2 | 2 |
| 3 | 4 |

The terminal may monitor a PSCCH in the slots corresponding to the resource pool within the resource sensing window 410 as described in steps S502 and S054 of FIG. 5 above, and may measure RSRPs of the PSCCH and a PSSCH corresponding thereto. In this case, a resource used by the terminal for its transmission within the resource sensing window 410 may be excluded from the sensing.

Step 3: The terminal may determine an initial threshold parameter $Th(p_i, p_j)$. The value of $Th(p_i, p_j)$ may be determined as the i-th value configured using a parameter sl-ThresPSSCH-RSRP-List, and in this case, i may be defined as $i = p_i + (p_j - 1)*8$.

Step 4: The terminal may initialize a resource set $S_A$. In this case, $S_A$ may be initialized with all possible candidate resources $R_{x,y}$.

Step 5: The terminal may exclude candidate resources $R_{x,y}$ satisfying the following conditions from the resource set $S_A$.

Condition 1: Slot $t'^{SL}_m$ which has not been monitored by the terminal in Step 2

Condition 2: When it is assumed that a first Sidelink Control Information (SCI) format (or SCI format 1-A) is received in the slot $t'^{SL}_m$ that the terminal has not monitored, and slots all sub-channels within the resource pool, which correspond to an arbitrary period value indicated by a 'Resource reservation period' field of the first SCI format among period values set by a higher layer parameter sl-ResourceReservePeriodList, are resource-allocated, a case where a condition c of Step 6 to be described below is satisfied Step 6: The terminal may exclude the candidate resources $R_{x,y}$ satisfying the following condition from the resource set $S_A$.

Condition a: The terminal receives the first SCI format in the slot $t'^{SL}_m$, the 'Resource reservation period' field of the first SCI format indicates a value of $P_{rsvp\_RX}$, and a 'Priority' field thereof indicates a $prio_{Rx}$.

Condition b: An RSRP value measured for the first SCI format is greater than $Th(prio_{Rx}, prio_{TX})$.

Condition c: Resources overlapping with the candidate resources $R_{x, y + j \times P'_{rsvp\_TX}}$ (j=0, 1, ..., $C_{resel-1}$) among slots and a set of resource blocks determined by the first SCI format received in the slot $t_m^{SL}$ or the first SCI format that is considered to be received in a slot $t_{m + q \times P'_{rsvp\_RX}}^{SL}$ (q=1, 2, ..., Q) according to the period value indicated by the 'Resource reservation period' field. Here, Q is defined as $$Q = \left\lceil \frac{T_{scal}}{P_{rsvp\_RX}} \right\rceil,$$

and $T_{scal}$ corresponds to a value obtained by converting the length of the resource selection window 420, $T_2$, in milliseconds (msec).

Step 7: If the number of remaining candidate resources in the resource set $S_A$ is less than $X \cdot M_{total}$, the terminal may increase the value of $Th(p_i, p_j)$ by 3 dB, and may perform the procedure again from Step 4.

The terminal may report the resource set $S_A$ determined through the above procedure to the higher layer.

If a resource $r_i$ in $(r_0, r_1, r_2, ...)$, which is a target resource for re-evaluation, is not included the resource set $S_A$, the terminal may report re-evaluation of the corresponding resource $r_i$ to the higher layer.

If a resource $r_i'$ in $(r_0', r_1', r_2', ...)$, which is a target resource for pre-emption, is excluded according to Step 6 above, is not included in the resource set $S_A$, and satisfies at least one of the following conditions, the terminal may report pre-emption of the resource $r_i'$ to the higher layer.

Condition 1: A parameter sl-PreemptionEnable is set to 'enable' and '$prio_{TX} > prio_{RX}$' is satisfied Condition 2: When the parameter sl-PreemptionEnable is set but not set to 'enable', and both '$prio_R X < prio_{pre}$' and '$prio_{TX} > prio_{RX}$' are satisfied The method described above will be described with reference to FIG. 6.

Figure 6:
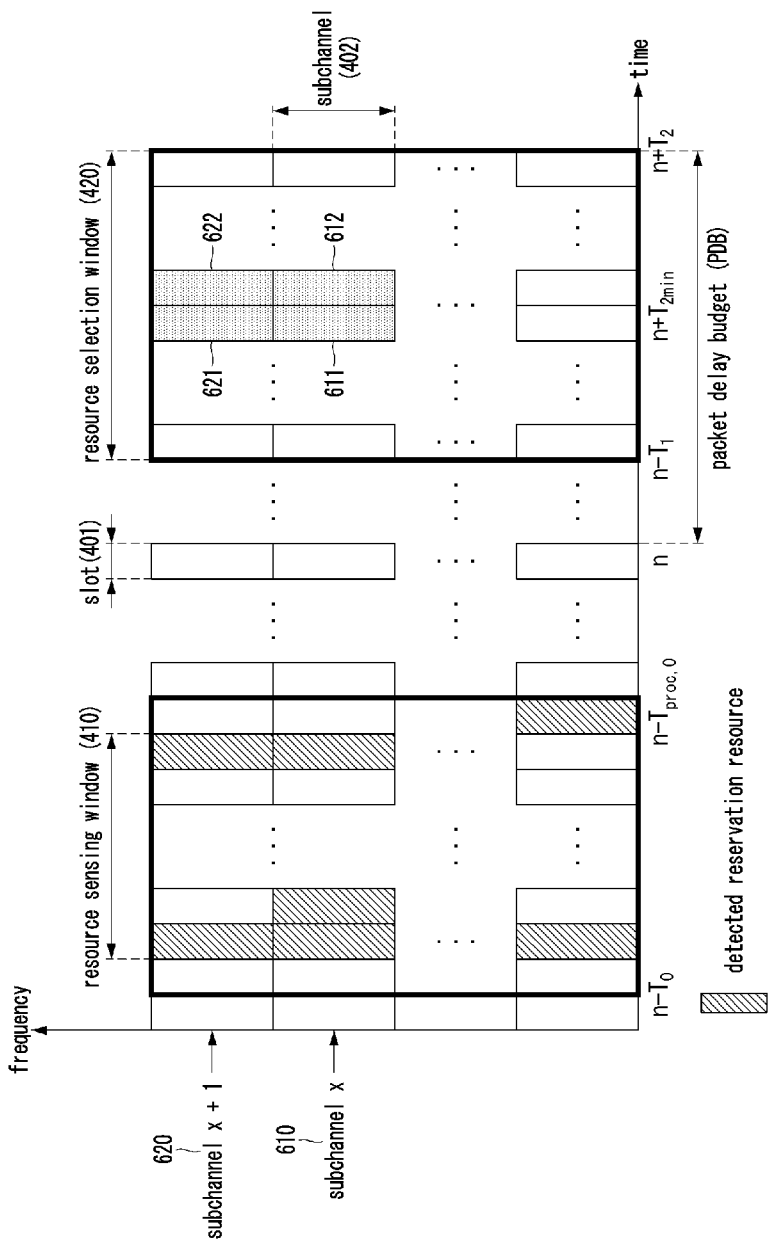
FIG. 6 is an exemplary diagram for describing a resource sensing procedure and a resource selection procedure in a terminal operating in the resource allocation mode 2.

FIG. 6 is an exemplary diagram for describing a resource sensing procedure and a resource selection procedure in a terminal operating in the resource allocation mode 2.

When two subchannels (i.e., $L_{subCH}$ is set to 2) starting from the x-th subchannel in the frequency domain are configured as described in Step 1, subchannels corresponding to a subchannel x 610 and a subchannel x+1 620 may be configured. In addition, the time period $[n+T_1, n+T_2]$ of the resource selection window 420 may be determined as described above. That is, frequency resources within the resource selection window may be the subchannel x 610 and the subchannel x+1 620, and the time period of the resource selection window 420 may be determined. When the resources are specified in this manner, $M_{total}$, which is the number of candidate resources in the candidate resource set, may be determined.

Next, since the time period of the resource sensing window 410 may be determined by $T_0$ determined based on the value set by the parameter sl-SwnsingWindow from the higher layer and $T_{proc,0}^{SL}$ defined according to the subcarrier spacing as described in Step 2, the resource sensing window 410 may be determined.

When the resource sensing window 410 is determined, the terminal may monitor a PSCCH from resources within the resource sensing window 410, and measure RSRPs for the PSCCH and a PSSCH corresponding thereto. If the PSCCH and/or PSSCH is detected, it may be confirmed that the corresponding resource is a reserved resource for use by another terminal. Therefore, the resource confirmed to be used by another terminal may be identified as a 'detected reservation resource' in FIG. 6.

For the resource set $S_A$ initialized in Step 4 for the terminal to select resources, the terminal may exclude the above-described resources including the detected reservation resource not monitored in Step 2. After excluding all resources to be excluded from the resource set $S_A$ based on the methods described above, the resource set $S_A$ may be configured only with the resources 611, 612, 621, and 622 that can be actually used for transmission. Accordingly, the terminal may perform sidelink communication using at least one of the remaining resources in the resource set $S_A$.

Here, when the resource set $S_A$ is configured only with the actually-transmittable resources 611, 612, 621, and 622, the candidate resource sets $R_{x,y}$ and $R_{x,y+1}$ may be configured as follows.

$R_{x,y}$ may include the resource 611 of the subchannel x 610 in the slot $t'^{SL}_y$ and the resource 621 of the subchannel x+1 620 in the slot $t'^{SL}_y$, and $R_{x,y+1}$ may include the resource 612 of the subchannel x 610 in the slot $t'^{SL}_y$ and the resource 622 of the subchannel x+1 620 in the slot $t'^{SL}_y$.

Since the terminal performing the resource sensing and resource selection procedures described above has to continuously perform PSCCH monitoring for resource sensing and RSRP measurements for PSCCH/PSSCH, power consumption thereof may occur significantly.

In order to solve this power consumption problem, standardization is currently in progress for sidelink discontinuous reception (DRX) and partial sensing for power saving of terminals in the release 17 NR sidelink.

In the present disclosure described below, a beam-based sidelink communication method included as a release 18 sidelink standardization item will be described first. The sidelink specifications prior to release 17 did not explicitly support a beam management technique for a frequency range 2 (FR2) corresponding to a high frequency band. However, in the recent 3GPP RAN plenary meeting, it was agreed that the standardization of the sidelink beam management operation method in a FR2 licensed band will be promoted in the upcoming release 18 standardization. According to a contribution RP-213678 discussed in the 3GPP RAN #94-e meeting, it was agreed that the release 18 supports a sidelink beam management operation by basically reusing the current sidelink CSI framework and the beam management techniques applied to an NR Uu link as much as possible, such as initial transmission beam selection, beam change, beam failure recovery procedure, and the like. Although, according to the contents discussed so far, the release 18 standardization work for the beam management technique is planned to be limited to unicast, but in the standardization after release 19, it is also possible to discuss the beam management technique for broadcast and groupcast, and thus research thereon is required.

Therefore, in the present disclosure, a method for a terminal to efficiently perform a resource selection procedure for each beam and beam-based sidelink transmission in a beam-based sidelink communication environment is proposed.

Figure 7:
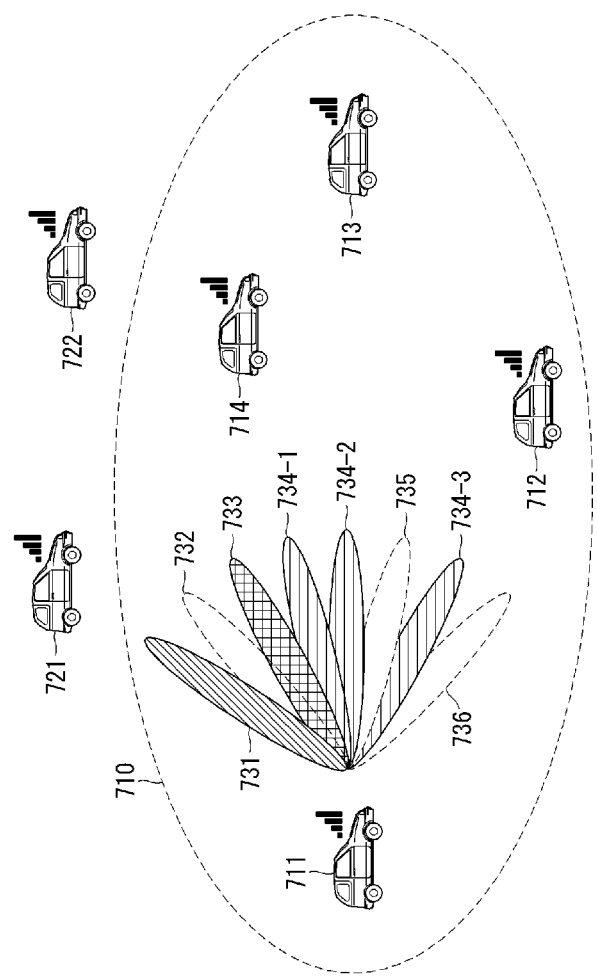
FIG. 7 is a conceptual diagram illustrating beam-based sidelink communication for broadcast, groupcast, and unicast according to the present disclosure.

FIG. 7 is a conceptual diagram illustrating beam-based sidelink communication for broadcast, groupcast, and unicast according to the present disclosure.

Referring to FIG. 7, vehicles 711, 712, 713, 714, 721, and 722 may mean the vehicle terminals 301 to 306 mounted on the vehicles (or attached to the vehicles, or carried or worn by drivers or passengers of the vehicles) as described above. For convenience of description, they will be described as being referred to as vehicles.

It is assumed that the vehicle 711 is a transmitting terminal, and the vehicle 711 will be referred to as a transmitting terminal in description of FIG. 7. Therefore, the transmitting terminal 711 and the vehicle 711 may be used interchangeably or alternatively. In addition, when the vehicle 711 may use a beamforming technique for sidelink communication, the vehicle 711 may uses a plurality of beams 731, 732, 733, 734-1, 734-2, 734-3, 735, and 736 for sidelink communication. Hereinafter, a terminal that transmits sidelink data (or, signal or message) through at least one of a plurality of beams using a beamforming technique for sidelink communication will be specifically referred to as a 'transmitting terminal'.

As described above, the transmitting terminal 711 using the plurality of beams 731, 732, 733, 734-1, 734-2, 734-3, 735, and 736 may perform sidelink communication with other vehicles by using at least one beam. The sidelink communication may be performed based on at least one scheme of broadcast, groupcast, and unicast.

For example, the transmitting terminal 711 may perform groupcast-based sidelink communication with the vehicles 712, 713, and 714 located within a groupcast communication region 710. Specifically, the transmitting terminal 711 may perform the groupcast-based sidelink communication with the vehicle 714 by using the beam 734-1, the transmitting terminal 711 may perform the groupcast-based sidelink communication with the vehicle 713 by using the beam 734-2, and the transmitting terminal 711 may perform the groupcast-based sidelink communication with the vehicle 712 by using the beam 734-3.

In addition, the transmitting terminal 711 may perform sidelink communication with the vehicles 721 and 722 located outside the groupcast communication region 710 based on broadcast/unicast or broadcast. Specifically, the transmitting terminal 711 may perform sidelink communication with the vehicle 721 based on unicast or broadcast. As another example, the transmitting terminal 711 may perform sidelink communication with the vehicle 722 based on broadcast.

As described above, in FIG. 7, each beam is expressed differently according to its purpose so that each scheme of broadcast, groupcast, and unicast can be identified during sidelink communication. The beams 732, 735, and 736 indicated by dotted lines may be beams not used for communication.

Meanwhile, according to the content agreed in the 3GPP RAN1 #106-e meeting, it was agreed that PSCCH reception and RSRP measurement for sensing are allowed even during a sidelink DRX inactive time. It has not yet been determined whether the corresponding operation, that is, the sensing operation of the terminal during the SL DRX inactive time will be explicitly supported by the technical specification or left to the implementation of the terminal itself. However, according to the content additionally agreed in the RAN1 #107-e meeting, it was agreed that a subset of resource candidates $S_A$, which a physical layer of a transmitting terminal reports to a medium access control (MAC) layer, is included at least within a DRX active time of a receiving terminal. If the transmitting terminal does not perform sufficient sensing operations during the SL DRX inactive time, sensing of some candidate resources within the DRX active time of the receiving terminal may not be performed or the sensing result may also be inaccurate. Therefore, the present disclosure additionally proposes a method for solving this problem.

First Exemplary Embodiment: Resource Selection Procedure for Each Unicast Beam

FIGS. 8A to 8D are conceptual diagrams for describing a resource selection process for each unicast beam according to the present disclosure.

Figure 8A:
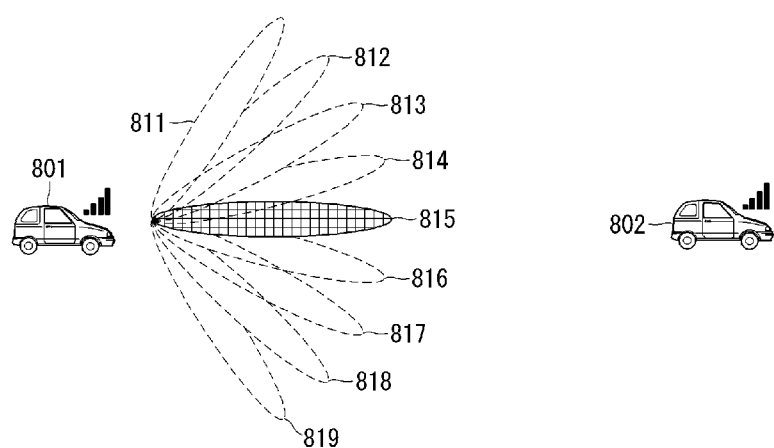
FIGS. 8A to 8D are conceptual diagrams for describing a resource selection process for each unicast beam according to the present disclosure.

Referring to FIG. 8A, a vehicle 801 may be a transmitting terminal and a vehicle 802 may be a receiving terminal. As described above in the present disclosure, a vehicle that transmits data (or, signal or message) through at least one beam using a beamforming technique in sidelink communication is referred to as a transmitting terminal. Hereinafter, a vehicle that receives data (or, signal or message) through at least one beam using a beamforming technique in sidelink communication will be referred to as a 'receiving terminal'. Therefore, in the following description, the vehicles 801 and 802 exemplified in FIGS. 8A to 8D will be described by classifying them as the transmitting terminal 801 and the receiving terminal 802.

As described in FIG. 7, the transmitting terminal 801 may use a plurality of beams 811, 812, 813, 814, 815, 816, 817, 818, and 819 in a beamforming manner. The transmitting terminal 801 may perform an initial access procedure with the receiving terminal 802 using the initial beam 815. In FIG. 8A, the initial beam 815 determined by the transmitting terminal 801 is illustrated as a beam in a line of sight (LOS) direction with the receiving terminal 802, but a beam other than the initial beam 815 illustrated in FIG. 8A may be used as an initial beam. Since the initial access procedure is not the main content of the present disclosure, a detailed description thereof will be omitted.

Figure 8B:
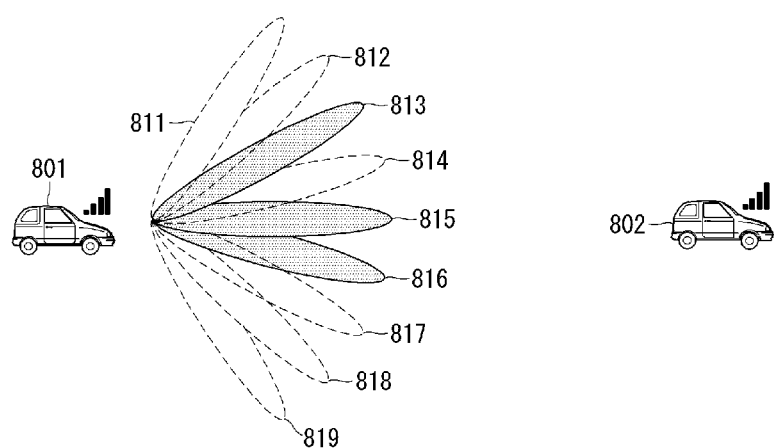

The transmitting terminal 801 may determine a beam candidate set $\mathcal{B}_{init}$ of beams that can be utilized for sidelink communication with the receiving terminal 802 among the plurality of beams 811, 812, 813, 814, 815, 816, 817, 818, and 819 through the initial access procedure (i.e., initial beam determination) for sidelink communication. The transmitting terminal 801 may determine the beam candidate set $\mathcal{B}_{init}$ through beam $\mathcal{B}$ sensing with the receiving terminal 802. The beam candidate set $\mathcal{B}_{init}$ usable for sidelink communication determined through the initial access procedure may be referred to as an initial beam candidate set. FIG. 8B illustrates a case in which three beams 813, 815, and 816 are selected as the initial beam candidate set $\mathcal{B}_{init}$. The number of beams included in the beam candidate set $\mathcal{B}_{init}$ usable for sidelink communication may be two or more, and the number of beams included in the beam candidate set $\mathcal{B}_{init}$ may be set by the terminal itself or by the higher layer.

In addition, the transmitting terminal 801 may perform Steps 1 to 7 of the resource selection procedure according to clause 8.1.4 of TS 38.214 described above. In this case, Steps 1 to 7 may be performed for each beam b∈$\mathcal{B}_A$=$\mathcal{B}_{init}$. That is, the transmitting terminal 801 may perform Steps 1 to 7 of the resource selection procedure for each beam. Here, b is a beam index.

In addition, the transmitting terminal 801 may periodically measure a signal strength of each beam in the initial beam candidate set $\mathcal{B}_{init}$ while performing sidelink communication. Also, the transmitting terminal 801 may periodically update the beam candidate set $\mathcal{B}_{init}$ based on a beam management mechanism performed based on the measured information. When the initial beam candidate set is updated, it may be referred to as an updated beam candidate set. Both the aforementioned initial beam candidate set and updated beam candidate set may be generically referred to as a beam candidate set. The beam candidate set obtained only in the initial access procedure is referred to as an initial beam candidate set, and may become an updated beam candidate set when update thereof is performed thereafter. Therefore, in the following description, when it is not necessary to specifically distinguish therebetween, they will be collectively referred to as a beam candidate set.

When the beam candidate set $\mathcal{B}_{init}$ is updated, the transmitting terminal 801 may reselect a beam using the updated beam candidate set $\mathcal{B}_{init}$ when performing a resource selection procedure. When Step 7 is reached in the resource selection procedure (i.e., the procedure of Steps 1 to 7 described above) for the beam b and the number of remaining candidate resources in a resource set $S_{A,b}$ for the beam b is smaller than a predetermined resource threshold $X_b \cdot M_{total}$, the terminal may exclude the beam b from a communication beam candidate set BA. However, after the procedures for all beams in $\mathcal{B}_{init}$ are completed, if the number of beam candidates |$\mathcal{B}_A$| is smaller than a preconfigured minimum number $N_{min,beam}$ of beam candidates, the threshold value $Th(p_i, p_j, b)$ for each beam may be increased by 3 dB, and the procedure from Step 4 for each beam b∈$\mathcal{B}_A$=$\mathcal{B}_{init}$ may be repeated. Here, $p_i$ is a value of a priority field in an SCI format 1-A received from the receiving terminal 802, and $p_j$ is a transmission priority of the transmitting terminal 801 that selects the resource.

Through the above-described procedure, when the number of beams is greater than the minimum number of beam candidates and each of the beams has candidate resources with the number equal to or greater than a resource threshold, the transmitting terminal 801 may obtain the communication beam candidate set $\mathcal{B}_A$, and the candidate resource $S_{A,b}$ for each beam within the communication beam candidate. These may be obtained in the physical layer of the transmitting terminal 810. Accordingly, the physical layer of the transmitting terminal 801 may report the communication beam candidate set $\mathcal{B}_A$, and the candidate resource $S_{A,b}$ for each beam within the beam candidate set to the higher layer.

Figure 8C:
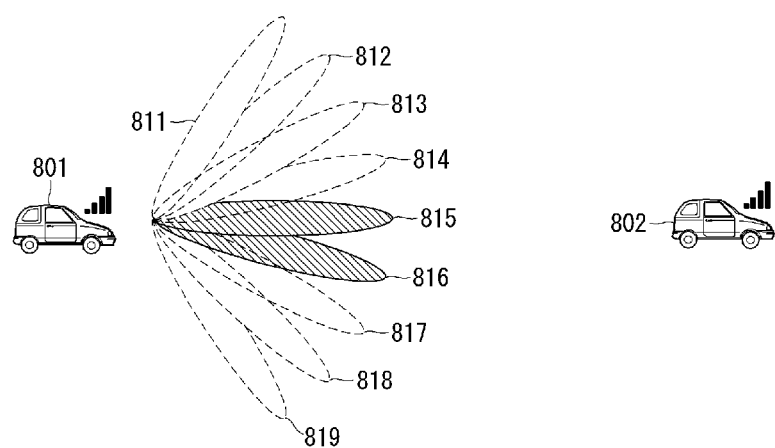

Referring to FIG. 8C, the physical layer of the transmitting terminal 801 may determine two beams 815 and 816 as "the communication beam candidate set $\mathcal{B}_A$", and report the candidate resource $S_{A,b}$ for each of the beams to the higher layer. That is, initial beam candidate set $\mathcal{B}_{init}$ determined as the communication beam candidate set $\mathcal{B}_A$ in FIG. 8B. Also, the initial beam candidate set $\mathcal{B}_{init}$ may be updated through periodic signal strength measurement. The physical layer may set $\mathcal{B}_{init}$ as an initial value of $\mathcal{B}_A$ in step 1 of the resource selection procedure. Then, from step 1 through step 7, an updated $\mathcal{B}_A$ set can be obtained. Two beams 815 and 816 belonging to the communication beam candidate set $\mathcal{B}_A$ obtained through the above process may be determined. That is, the beams 815 and 816 belonging to the communication beam candidate set $\mathcal{B}_A$ and the respective resource candidates $S_{A,b}$ can be reported to the upper layer together. Here, the higher layer may be a MAC layer and/or an RRC layer.

Figure 8D:
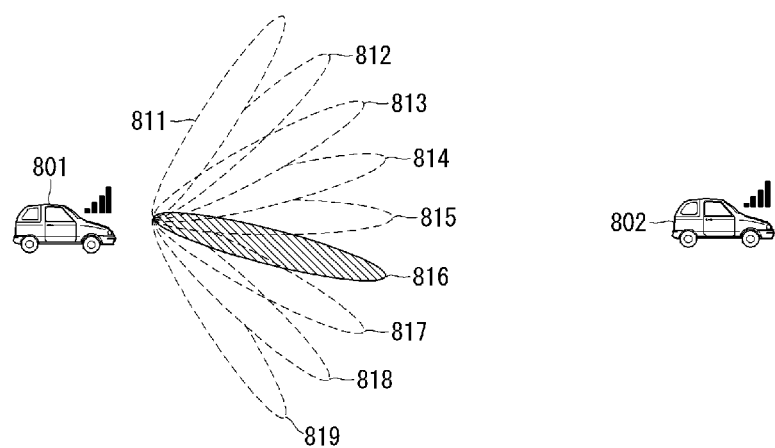

Based on this report, the higher layer of the transmitting terminal 801 may select a transmission beam $\hat{b} \in \mathcal{B}_A$ and a resource for unicast communication within the beam, that is, at least one specific beam and a resource to be used within the corresponding beam. FIG. 8D illustrates a case in which the higher layer of the transmitting terminal 801 selects one beam 816 from the communication beam candidate set $\mathcal{B}_A$ as a beam for unicast communication. In addition, the higher layer of the transmitting terminal 801 may select a resource (selected from a resource set $S_{A,\hat{b}}$) to be used in the communication beam 816 determined to be used for communication in the communication beam candidate set $\mathcal{B}_A$. Accordingly, the physical layer of the transmitting terminal 801 may perform unicast communication using the communication beam 816 determined for unicast communication and the resource to be used in the communication beam 816 during sidelink communication.

Meanwhile, since it is impossible to perform continuous sensing on all beams in the beam-based sidelink resource selection procedure, it may be preferable for obtaining accurate sensing results that the number of beams in the beam candidate set $\mathcal{B}_{init}$ determined by the above-described initial access procedure (i.e., initial beam determination) or beam management mechanism is reduced as much as possible.

Second Exemplary Embodiment: Resource Selection Procedure for Each Unicast Beam for Information Sharing Between Terminals The transmitting terminal 801 may utilize a non-preferred beam set and a preferred beam set informed by the receiving terminal 802 through SCI or a MAC CE in the above-described resource selection procedure for each beam. The receiving terminal 802 may inform the transmitting terminal 801 of the non-preferred beam set and the preferred beam set in advance so that the transmitting terminal 801 performs one or more of Operations A to D below.

Operation A: A beam in the non-preferred beam set is excluded from the initial candidate set $\mathcal{B}_{init}$.

Operation B: A value of $X_b$ for beams in the non-preferred beam set is set higher than a value set for the remaining beams, so that a probability of the receiving terminal's non-preferred beam being selected is decreased.

Operation C: A value of $X_b$ for beams in the preferred beam set is set to be smaller than a value set for the remaining beams, so that a probability of the receiving terminal's preferred beam being selected is increased.

Operation D: An operation of excluding beam(s) from the beam candidate set $\mathcal{B}_{init}$ according to information on the non-preferred beam set and information on the preferred beam set may be performed by a preference evaluation method for each beam described later in the fifth exemplary embodiment.

Third Exemplary Embodiment: Information Sharing Between Terminals to Support Resource Selection Procedure for Each DRX Mode Unicast Beam In order to solve the above-described problem in which the transmitting terminal cannot perform sufficient sensing for some candidate resources within the DRX active time of the receiving terminal and to obtain more accurate sensing results, the transmitting terminal 801 may need to perform resource sensing as many times as possible within its inactive time. To this end, the receiving terminal 802 may inform the transmitting terminal 801 of a minimum amount of resources $M_{min,b}$ (e.g., number of logical slots) for each beam, which need to be sensed during the inactive time of the transmitting terminal 801, through SCI or a MAC CE, so that as many resources as possible within its active time can be selected.

Upon receiving the minimum amount of resources $M_{min,b}$ for each beam, which need to be sensed during the inactive time, the transmitting terminal 801 performing DRX may perform resource sensing on resources greater than or equal to the minimum amount of resources for each beam in the beam candidate set during the inactive time based on the received information.

Fourth Exemplary Embodiment: Beam-Based Broadcast Transmission Method

In the FR2 band being considered in 5G NR, it may be necessary to form a beam with a narrow beam width to secure a coverage required for each V2X use case, and it may be necessary to support multiple beams to groupcast or broadcast signals to receiving terminals located in various directions. However, when the transmitting terminal needs to perform resource sensing on all beams by alternating beams, the accuracy of resource sensing for each beam may decrease. In the case of broadcast communication, in most cases, important information that needs to be delivered to all nearby terminals may be generally transmitted in the broadcast manner. Therefore, it may be a principle to broadcast information using all available beams, but it may be necessary to reduce complexity and delay time caused by sequentially transmitting information using all available beams by minimizing unnecessary transmissions.

In the present disclosure, in order to solve the above-described problem, the transmitting terminal 801 may transmit a signal only when it is determined that there is the receiving terminal 802 that needs to receive information in a direction indicated by a beam among available beams. The transmitting terminal 801 may determine a beam set to be used for broadcast transmission among available beams by continuously or periodically measuring the respective beams, and may perform broadcast communication using the determined beam set. That is, the transmitting terminal 801 may transmit sidelink data in the broadcast manner.

A method for determining a broadcast transmission beam set according to the present disclosure may use one of the following methods.

Method 1: The transmitting terminal 801 may use an RSRP for sidelink measured through resource sensing (e.g., an RSRP for a PSSCH or RSRP for a PSCCH). Specifically, when an RSRP measured for a PSSCH or an RSRP measured for s PSCCH exceeds a pre-configured first threshold $RSRP_{thre,1}$ during resource sensing for each beam, the transmitting terminal 801 may include the corresponding beam in the transmission beam set. On the other hand, when an RSRP measured for a PSSCH or an RSRP measured for a PSCCH is less than a pre-configured second threshold $RSRP_{thre,2}$ during resource sensing for each beam, the transmitting terminal 801 may exclude the corresponding beam from the transmission beam set. If an RSRP measured for a PSSCH or an RSRP measured for a PSCCH is a value between the two threshold values, the transmitting terminal 801 may autonomously determine whether to transmit the corresponding beam.

Method 2: Similarly to Method 1, the transmitting terminal 801 may measure a degree of channel congestion (e.g., channel busy ratio (CBR)) for each beam, and use the result to determine whether to transmit the corresponding beam. Here, the CBR is an index defined in the 3GPP specification, and the definition of CBR measured in a subframe n is as follows. The CBR may mean a portion of subchannels within a resource pool, which are detected as having a sidelink RSSI measured for PSSCH(s) by the transmitting terminal 801 during subframes [n−100, n−1] exceeding a pre-configured threshold.

Accordingly, if a CBR exceeds a first threshold $CBR_{thre,1}$, the transmitting terminal 801 performing Method 2 may include the corresponding beam in the transmission beam set. On the other hand, if a CBR is less than a second threshold $CBR_{thre,2}$, the transmitting terminal 801 performing Method 2 may exclude the corresponding beam from the transmission beam set. If a measured CBR is a value between the two threshold values, the transmitting terminal 801 may autonomously determine whether to transmit the corresponding beam.

Meanwhile, those skilled in the art can know that the first threshold according to Method 1 and the first threshold according to Method 2 described above are different from each other, and that the second threshold according to Method 1 and the second threshold according to Method 2 described above are different from each other.

Fifth Exemplary Embodiment: Method for Determining a Beam Candidate Set Based on Preference for Each Beam in Groupcast The transmitting terminal 801 performing groupcast communication may perform a resource selection procedure in an initial access procedure (i.e., initial beam determination) with receiving terminals in a groupcast communication group, or may perform a resource selection procedure for each beam determined through a beam management procedure with the receiving terminals in the groupcast communication group.

In either of the above two procedures, when the number of beams in the beam candidate set $\mathcal{B}_{init}$ it exceeds a pre-configured threshold M, the transmitting terminal 801 may reconfigure the beam candidate set $\mathcal{B}_{init}$ configured at the beginning of the resource selection procedure by considering the non-preferred beam set and the preferred beam set informed by the receiving terminal within the group. This will be described with reference to FIG. 8E.

Figure 8E:
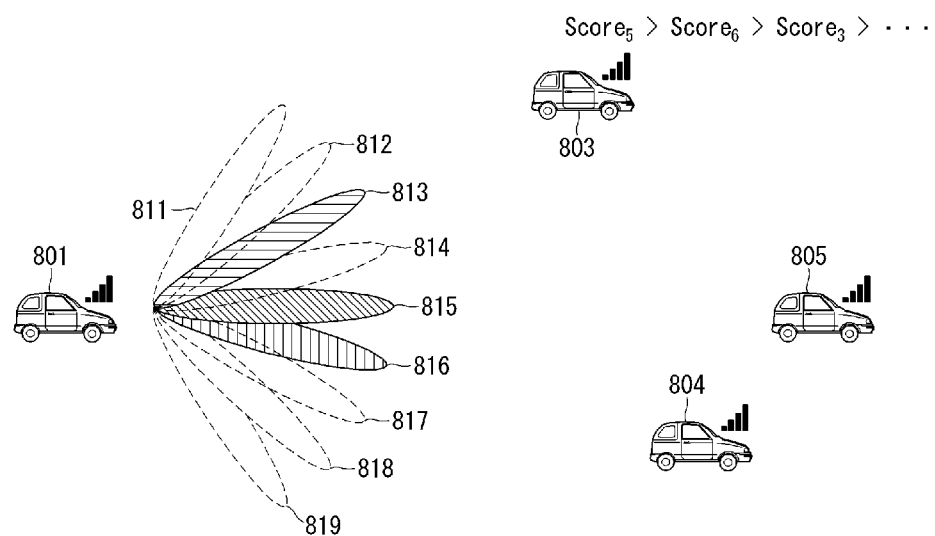
FIG. 8E is a conceptual diagram for describing an operation of sensing a beam selected according to a beam preference score by a sidelink transmitting terminal according to an exemplary embodiment of the present disclosure.

FIG. 8E is a conceptual diagram for describing an operation of sensing a beam selected according to a beam preference score by a sidelink transmitting terminal according to an exemplary embodiment of the present disclosure.

Referring to FIG. 8E, the transmitting terminal 801 may perform beamforming using the plurality of transmitting beams 811 to 819. In FIG. 8E, beams that can be beamformed by the transmitting terminal 810 may be referred to as the first beam 811, the second beam 812, the third beam 813, the fourth beam 814, the fifth beam 815, the sixth beam 816, the seventh beam 817, the eighth beam 818, and the ninth beam 819. Accordingly, a beam index of the first beam 811 may be 1, a beam index of the second beam 812 may be 2, a beam index of the third beam 813 may be 3, a beam index of the fourth beam 814 may be 4, a beam index of the fifth beam 815 may be 5, a beam index of the sixth beam 816 may be 6, a beam index of the seventh beam 817 may be 7, a beam index of the eighth beam 818 may be 8, and a beam index of the ninth beam 819 may be 9.

It is assumed that the transmitting terminal 801 has previously received a non-preferred beam set and a preferred beam set informed (e.g., transmitted or provided) by each of the receiving terminals 803, 804, and 805. The transmitting terminal 801 may calculate a score $Score_b$ for each beam as shown in Equation 1 below, considering the non-preferred beam sets and the preferred beam sets informed by the receiving terminals 803, 804, and 805.

$$Score_b = \sum_{i \in RXUE} \left( \alpha_b Score_{b,i}^{prefer} - (1-\alpha_b) Score_{b,i}^{non-prefer} \right), b \in \mathcal{B}_{init} \quad \text{[Equation 1]}$$

$Score_{b,i}^{prefer}$ may be a score value applied when the transmitting terminal 802 receives, from the i-th receiving terminal within the group, information that a b-th transmission beam is preferred. For example, when the transmitting terminal 801 receives, from the i-th receiving terminal, information that the b-th transmission beam is preferred, a value for the b-th transmission beam may be set to 1, and when the transmitting terminal 801 does not receive, from the i-th receiving terminal, information that the b-th transmission beam is preferred, the value for the b-th transmission beam may be set to 0.

$Score_{b,i}^{prefer}$ may be a score value applied when the transmitting terminal 801 receives, from the i-th receiving terminal within the group, information that the b-th transmission beam is not preferred. For example, when the transmitting terminal 801 receives, from the i-th receiving terminal, information that the b-th transmission beam is not preferred, a value for the b-th transmission beam may be set to 1, and when the transmitting terminal 801 does not receive, from the i-th receiving terminal, information that the b-th transmission beam is not preferred, the value for the b-th transmission beam may be set to 0.

$\alpha_b \in [0, 1]$ may be set to a different value according to a preferred beam from the perspective of the transmitting terminal 801. For example, when the transmitting terminal 801 prefers the b-th beam, $\alpha_b$ may be set to 0.7, which is greater than 0.5.

In addition, the transmitting terminal 801 may need to select the beam candidate set $\mathcal{B}_{init}$ such that the number M of the selected beams satisfies Equation 2 below.

$$M_{min} \leq M \leq M_{max} \quad \text{[Equation 2]}$$

In Equation 2, $M_{min}$ and $M_{max}$ may be values configured by the higher layer or preconfigured value.

In addition, when scores are calculated for each beam by Equation 1 above, the transmitting terminal 801 may finally reconfigure M beams with high scores as the initial beam candidate set $M_{max}$ for the resource selection procedure for each groupcast beam.

For example, it may be assumed that the third beam 813, the fourth beam 814, the fifth beam 815, and the sixth beam 816 are determined as the beam candidate set $\mathcal{B}_{init}$. If they are expressed with beam indexes, the initial beam candidate set $\mathcal{B}_{init}$ it may be expressed as {3, 4, 5, 6}. In this case, when the beams are reconfigured according to the beam preference scores, the initial beam candidate set $\mathcal{B}_{init}$ may be determined as {3, 5, 6}. In this case, assuming that the pre-configured threshold M for the size of the beam candidate set $\mathcal{B}_{init}$ it is 3, the initial beam candidate set $\mathcal{B}_{init}$ may be configured as {3, 5, 6}. FIG. 8E illustrates a case in which $\mathcal{B}_{init}$={3, 5, 6} is determined as the initial beam candidate set when beams are reconfigured according to the beam preference scores.

Meanwhile, when the size of the beam candidate set $\mathcal{B}_{init}$ for sensing is smaller than the pre-configured threshold M, the transmitting terminal 801 may sequentially perform the resource selection procedure for all beams in the initial beam candidate set Binit.

On the other hand, the method of calculating scores for each beam according to Equation 1 above may be used also when selecting a resource for a unicast beam. In case of selecting a resource for a unicast beam, only one beam having the highest score among beams may be selected using the method described in Equation 1. Accordingly, when selecting a unicast beam, the step of comparing the size of the beam candidate set $\mathcal{B}_{init}$ with the pre-configured threshold M is not required.

Sixth Exemplary Embodiment: Group Beam Based Resource Sensing Method

In general, there is a very high probability of obtaining similar resource sensing results between adjacent beams. Accordingly, the transmitting terminal 801 may use available beams by grouping the available beams. This will be described with reference to FIG. 8F.

Figure 8F:
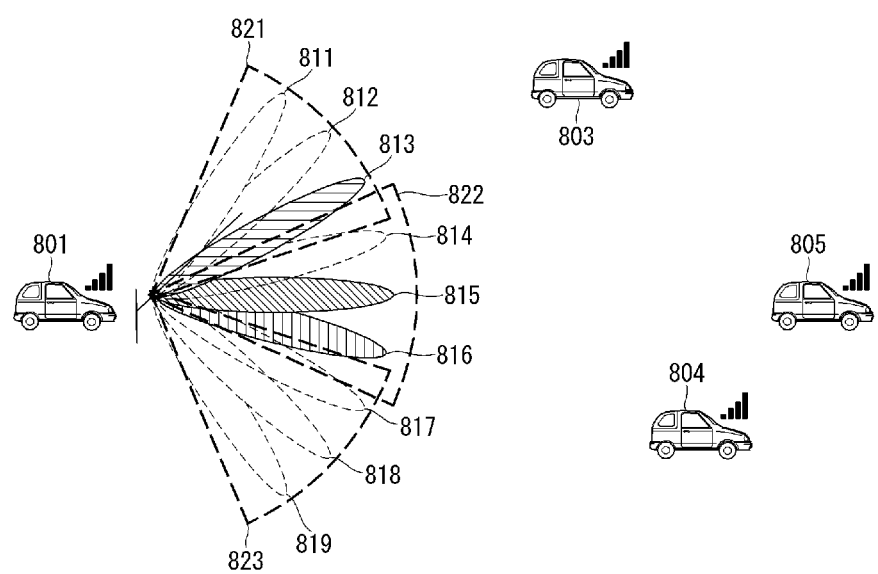
FIG. 8F is a conceptual diagram for describing a case in which a sidelink transmitting terminal groups beams and performs sensing for each beam group according to the present disclosure.

FIG. 8F is a conceptual diagram for describing a case in which a sidelink transmitting terminal groups beams and performs sensing for each beam group according to the present disclosure.

Referring to FIG. 8F, the first beam 811 to the third beam 813 are grouped into a first group 821, and the fourth beam 814 to the sixth beam 816 are grouped into a second group 822, and the seventh beam 817 to the ninth beam 819 are grouped into a third group 823.

As illustrated in FIG. 8F, the transmitting terminal 801 may group two or more beams to be sensed in a group unit. When the transmitting terminal 801 can simultaneously form a plurality of beams, sensing may be performed by simultaneously forming beams within one group. For example, when sensing the first group 821, sensing may be performed by simultaneously forming all of the beams 811, 812, and 813 included in the first group 821.

There may be a case where the transmitting terminal 801 can form only one beam within one group at a time. In this case, when selecting one beam within one group, the transmitting terminal 801 may use one of the following methods.

Beam Selection Method 1: When selecting one beam among a plurality of beams within one group, the transmitting terminal 801 may randomly select a beam to be used for sensing.

Beam Selection Method 2: When selecting one beam among a plurality of beams within a group, the transmitting terminal 801 may select a beam having the highest preference within the group by applying a preference evaluation method of the transmitting terminal 801, and use the beam for resource sensing.

Beam Selection Method 3: When selecting one beam among a plurality of beams within a group, the transmitting terminal 801 may select a beam having the highest preference within the group by applying a preference evaluation method reported from the receiving terminal, and use the beam for resource sensing.

Beam Selection Method 4: When selecting one beam among a plurality of beams within a group, the transmitting terminal 801 may calculate a score based on a preference reported by the receiving terminal and a preference of the transmitting terminal 801 for each beam within the group, select a beam having the highest calculated score, and use the beam for resource sensing.

The resource sensing may be performed using one beam selected from the first group 821 based on one of the methods described above, and then the resource sensing may be performed using one beam selected from the second group 822 using the same method. In addition, the resource sensing may also be performed using one beam selected from the third group 823 using the same method. In this manner, time and energy of the resource sensing can be saved by grouping a plurality of adjacent beams into one group and selecting one of the beams as a representative beam of the corresponding group. However, it may be preferable that beams grouped into one group are composed of beams with a high probability of obtaining similar resource sensing results.

The resource sensing method based on grouping described above may be used for unicast, multicast, and broadcast scheme.

Seventh Exemplary Embodiment: Transmission Beam Selection Method after Group Beam-Based Resource Sensing When a resource set is determined by performing group beam-based sensing, a beam finally used for sidelink communication may basically be selected as the beam used for resource sensing. However, at a request of the higher layer of the transmitting terminal 801 or the receiving terminal, sidelink communication may be performed by selecting a beam other than the selected beam (i.e., beam used for resource sensing) within the beam group by one of the following methods.

Method 1: A method of randomly selecting among the remaining beams within the beam group Method 2: A method of selecting a beam having the highest score based on the preference of the transmitting terminal and/or the preference of the receiving terminal among the remaining beams within the beam group Method 3: A method of randomly selecting a beam among beams closest to the beam used for resource sensing within the beam group Method 4: A method of randomly selecting a beam among beams quasi-co-located (QCLed) with the beam used for resource sensing within the beam group The above-described transmission beam selection methods after resource sensing may also be used for unicast, multicast, and broadcast schemes.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a transmitting terminal, comprising:
   determining a beam candidate set including two or more beams usable for sidelink communication with a receiving terminal from among a plurality of beams that can be beam-formed;
   determining a resource set for each beam within the beam candidate set through resource sensing, such that the resource set has candidate resources equal to or greater than a predetermined number of candidate resources;
   selecting a beam and a resource to be used for sidelink communication with the receiving terminal based on the beam candidate set and the resource set; and
   transmitting sidelink data to the receiving terminal using the selected beam and the selected resource,
   wherein the selected beam is a first beam having a channel busy ratio (CBR) equal to or greater than a pre-configured first threshold from the beam candidate set, when selecting beams to be used for broadcasting from the beam candidate set.

2. The method according to claim 1, further comprising:
   periodically measuring a signal strength for each of two or more beams within the beam candidate set; and
   updating beams within the beam candidate set based on the measured signal strengths.

3. The method according to claim 1, further comprising receiving at least one of a non-preferred beam set and a preferred beam set from the receiving terminal.

4. The method according to claim 3, further comprising:
   assigning a first weight to each beam of the preferred beam set;
   assigning a second weight to each beam of the non-preferred beam set;
   calculating scores of at least one beam to which the first weight is assigned and at least one beam to which the second weight is assigned; and
   determining the beam candidate set based on the calculated scores,
   wherein the first weight is a value greater than the second weight.

5. The method according to claim 3, further comprising receiving, from the receiving terminal, information on a minimum amount of resources for each beam on which sensing is to be performed during an inactive time of the transmitting terminal.

6. The method according to claim 5, wherein the information on the minimum amount of resources includes a number of logical slots, and the information on the minimum amount of resources is included in sidelink control information (SCI) or a medium access control (MAC) control element (CE) transmitted from the receiving terminal.

7. The method according to claim 1, further comprising:
   grouping two or more beams among the plurality of beams into one group; and
   performing beam sensing based on the group.

8. The method according to claim 1, wherein when selecting beams to be used for broadcasting from the beam candidate set, beams whose reference signal received powers (RSRPs) measured through the resource sensing are equal to or greater than a pre-configured first threshold are selected as the beams to be used for broadcasting.

9. A transmitting terminal comprising a processor, wherein the processor causes the transmitting terminal to perform:
   determining a beam candidate set including two or more beams usable for sidelink communication with a receiving terminal from among a plurality of beams that can be beam-formed;
   determining a resource set for each beam within the beam candidate set through resource sensing, such that the resource set has candidate resources equal to or greater than a predetermined number of candidate resources;
   selecting a beam and a resource to be used for sidelink communication with the receiving terminal based on the beam candidate set and the resource set; and
   transmitting sidelink data to the receiving terminal using the selected beam and the selected resource,
   wherein the selected beam is a first beam having a channel busy ratio (CBR) equal to or greater than a pre-configured first threshold from the beam candidate set, when selecting beams to be used for broadcasting from the beam candidate set.

10. The terminal according to claim 9, wherein the processor further causes the transmitting terminal to perform:
    periodically measuring a signal strength for each of two or more beams within the beam candidate set; and
    updating beams within the beam candidate set based on the measured signal strengths.

11. The terminal according to claim 9, wherein the processor further causes the transmitting terminal to perform:
    receiving at least one of a non-preferred beam set and a preferred beam set from the receiving terminal.

12. The terminal according to claim 11, wherein the processor further causes the transmitting terminal to perform:
    assigning a first weight to each beam of the preferred beam set;
    assigning a second weight to each beam of the non-preferred beam set;
    calculating scores of at least one beam to which the first weight is assigned and at least one beam to which the second weight is assigned; and
    determining the beam candidate set based on the calculated scores,
    wherein the first weight is a value greater than the second weight.

13. The terminal according to claim 11, wherein the processor further causes the transmitting terminal to perform:
    receiving, from the receiving terminal, information on a minimum amount of resources for each beam on which sensing is to be performed during an inactive time of the transmitting terminal; and
    performing resource sensing for each beam included within the beam candidate set during the inactive time of the transmitting terminal based on the information on the minimum amount of resources.

14. The terminal according to claim 13, wherein the information on the minimum amount of resources includes a number of logical slots, and the information on the minimum amount of resources is included in sidelink control information (SCI) or a medium access control (MAC) control element (CE) transmitted from the receiving terminal.

15. The terminal according to claim 9, wherein the processor further causes the transmitting terminal to perform:
   grouping two or more beams among the plurality of beams into one group; and
   performing beam sensing based on the group.

16. The terminal according to claim 15, wherein the processor further causes the transmitting terminal to perform, when selecting beams to be used for broadcasting from the beam candidate set, configuring beams whose reference signal received powers (RSRPs) measured through the resource sensing are equal to or greater than a pre-configured first threshold as the beams to be used for broadcasting.

17. A method of a receiving terminal, comprising:
   performing an initial access procedure with a transmitting terminal capable of sidelink communication through a plurality of beams by using a first beam of the transmitting terminal;
   transmitting at least one of a non-preferred beam set and a preferred beam set to the transmitting terminal; and
   when the transmitting terminal performs sidelink discontinuous reception (DRX), transmitting, to the transmitting terminal, information on a minimum amount of resources for each beam on which sensing is to be performed during a DRX inactive time of the transmitting terminal,
   wherein the information on the minimum amount of resources includes a number of logical slots.

18. The method according to claim 17, wherein the information on the minimum amount of resources is included in sidelink control information (SCI) or a medium access control (MAC) control element (CE) transmitted from the receiving terminal.

* * * * *